United States Patent

[11] 3,570,349

| [72] | Inventors | Otto Behrendt<br>Dusseldorf-Eller;<br>Helmut Robra, Mulheim(Ruhr), Germany |
|---|---|---|
| [21] | Appl. No. | 792,603 |
| [22] | Filed | Jan. 21, 1969 |
| [45] | Patented | Mar. 16, 1971 |
| [73] | Assignee | Schloemann Aktiengesellschaft<br>Dusseldorf, Germany |
| [32] | Priority | Jan. 26, 1968 |
| [33] | | Germany |
| [31] | | P 16 52 782.5 |

[54] SAW FOR DIVIDING WORKPIECES
10 Claims, 5 Drawing Figs.

[52] U.S. Cl. ................................................ 83/380,
83/390, 83/453, 83/465, 83/466, 269/31, 269/110,
269/237
[51] Int. Cl. ................................................. B26d 7/02
[50] Field of Search .......................................... 269/24, 27,
31, 32, 110, 237, 238, 239, 153, 154, 155, 152;
83/453, 457, 458, 461, 466, 490, 380, 390, 467;
143/46, 47

[56] References Cited
UNITED STATES PATENTS
1,729,076   9/1929   Laycock ...................... 269/32
2,304,926  12/1942   Juvinall ....................... 225/2
2,686,350   8/1954   Payne ......................... 83/490X

*Primary Examiner*—James M. Meister
*Attorney*—Holman & Stern

ABSTRACT: A saw for dividing one or more workpieces lying side-by-side parallel to one another in a clamping device, in which the saw is moved while the clamping device is stationary, and the workpieces are clamped in the clamping device in a vertical direction between an upper jaw and a lower jaw, and at the same time are pressed in a horizontal direction against a stationary abutment arranged on the side of the clamping device remote from the saw, so that the clamping device is freely accessible from the other side and also transversely to the direction of motion of the saw. The saw, with respect to its speed of advance, is positively guided, and the upper jaw, for the clamping of the workpieces in a vertical direction, can swing about a pivot, and, for the pressing of the workpieces against the stationary abutment, is provided with a further abutment displaceable relatively to the stationary abutment, so that a so-called drawing of the saw into the material is prevented, and the upper jaw, upon coming into contact with the workpieces, is moved exactly perpendicularly to the bearing plane of the workpieces.

Patented March 16, 1971

INVENTORS
OTTO BEHRENDT
HELMUT ROBRA

BY Holman, Glascock,
Downing & Seebold
ATTORNEYS

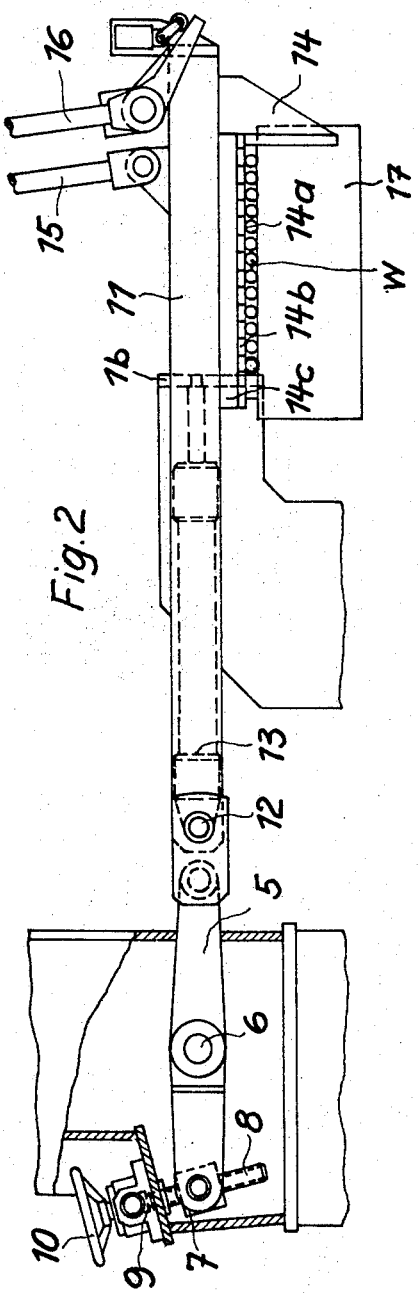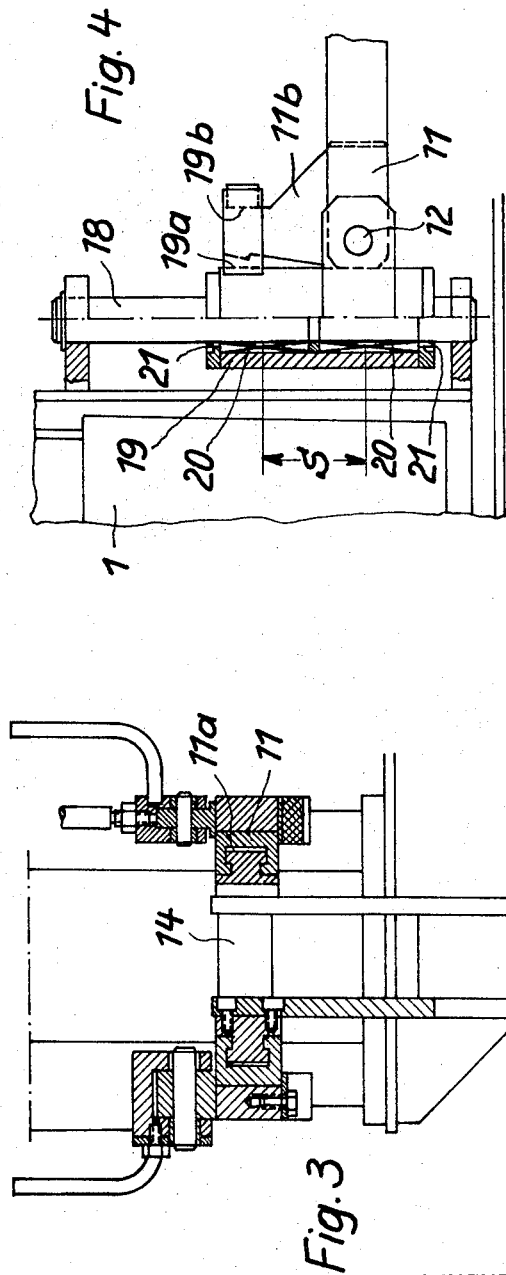

INVENTORS
OTTO BEHRENDT
HELMUT ROBRA

SAW FOR DIVIDING WORKPIECES

BACKGROUND OF THE INVENTION

This invention relates to a saw for dividing one or more workpieces lying side-by-side parallel to one another in a clamping device, in which the saw is moved, and the workpieces are clamped in a vertical direction between an upper jaw and a lower jaw in the clamping device, and are at the same time pressed in a horizontal direction against a stationary abutment, arranged on the side of the clamping device remote from the saw, so that the clamping device is freely accessible from the other side, and also transversely to the direction of motion of the saw.

With such saws and their clamping devices it is known to clamp the workpieces with a casing member of the saw and with a hook. For this purpose, the casing member of the saw is moved by parallel guides, at an angle less than 45° relatively to the bearing or supporting surface of the workpieces, or in other words, the workpieces are thereby pressed against their bearing or supporting surface. At the same time, the workpieces are drawn with the hook towards a stationary abutment, which is perpendicular to the bearing surface of the workpieces. The hook is here a part of the feeding drive of the saw, or serves as the abutment that takes up the cutting forces of the saw in the direction of feed. In this abutment, the saw, for the purpose of effecting the cutting, is drawn by an air cylinder, which is connected by way of a rod-and-lever mechanism with the hook, towards the workpieces. In this case, the saw per se is drawn, in part, according to the form of the workpiece, into the workpieces, and may experience, in consequence of the cross section of material varying, in tubes for instance, in relation to the particular depth of cutting, a very great feeding thrust, so that the teeth of the saw blade are overloaded, and are very liable to break. Furthermore, the part of the saw casing that presses the workpieces against their abutment surface moves not only perpendicularly to the abutment surface, but at the same time also horizontally, so that the workpieces lying unarranged in the clamping device undergo at the same time a horizontal movement, without being sufficiently guided in this direction. Workpieces, such as angle bars, for example, pack together or become wedged one in another. This means that after the clamping, some workpieces may have become loose, or become heaved up in the sawing, so that the saw blade is also additionally endangered, and a clean cut is prevented.

The object of the invention is to effect the clamping of the workpieces and the guiding of the saw or of its feeding thrust in such a way that the cutting conditions requisite for as long a useful life as possible for the saw, and for a clean cut, are ensured.

SUMMARY OF THE INVENTION

This object is substantially attained, according to the invention, by the feature that the saw, with respect to its speed of advance, is guided positively, and that the upper jaw, for the clamping of the workpieces, is so arranged as to be able to swing in a vertical plane and is provided for the pressing of the workpieces against the stationary abutment, with a further abutment, displaceable relatively to the stationary abutment.

Owing to its rockable arrangement, the upper jaw moves for a corresponding workpiece height, at the moment of its contact with the workpieces, exactly perpendicularly to the bearing surface thereof. In this way, the movement of the workpiece parallel to the bearing surface, occasioned by the displaceable further abutment, can be suspended until the upper jaw imparts to the workpieces, by pressing on the lower jaw, such an exact guidance, with this movement parallel to the bearing surface, that a mutual entanglement and jamming is prevented. Furthermore, by the positive guidance of the saw, a resistance is set up against the drawing of the saw into the material, so that the required cutting conditions are ensured.

In a further development of the invention, the upper jaw is pivoted, for the rockable supporting thereof, to a lever, which in its turn is rockably supported, and presents a movement drive and an arresting means. As the movement drive, an adjusting spindle is provided, which advantageously, in consequence of its self-locking or irreversibility, also provides an arresting means. This adjusting spindle is rotatable, and, at the fulcrum of the lever, is rockably supported in the saw casing, while in the lever a screw-threaded member is provided, corresponding to the adjusting spindle, and at the same time so supported as to be rotationally fast, but movable in the plane of oscillation of the lever. With the lever, the adjusting spindle and the associated threaded member, there is advantageously a simple and robust supporting of the upper jaw, and its axis of oscillation admits of being very simply and accurately adjusted to the height of any workpiece.

Instead of the lever, there may be employed as a means for supporting the upper jaw, a bearing block, which is movable, by means of an actuating member, in a guide, towards the plane containing the bearing surface of the workpieces. On the bearing block are provided abutments which limit the angle of oscillation of the upper jaw to an acute angle, one arm of which is parallel to the bearing plane of the workpieces.

For the rocking of the upper jaw, and, at the same time, as an actuating member for the bearing block, a power piston engages the upper jaw in such a way that the center of gravity of its contact surface with the workpieces lies, between the place at which the power piston acts on the upper jaw and the axis of oscillation of the upper jaw, the ratio of the length with which the bearing block is guided in the guide, to the distance between the place of engagement of the power piston and the axis of oscillation of the upper jaw being greater than the value of the friction between the guide and the bearing block. In this way, the upper jaw is moved towards or away from the workpieces according to the actuation of the power piston, the jamming that occurs between the guide and the bearing block, which is comparable with the jamming of a cabinetmaker's cramp, not being sufficient to prevent this movement, that is to say, the frictional force occurring in the guide is less than the force of the power piston moving the upper jaw. As a consequence, an automatic adjustment of the axis of oscillation of the upper jaw to the height of the workpiece is advantageously provided.

Further, on the bearing block, at least one clamping member is provided, which prevents the bearing block moving as a result of its intrinsic weight or of the weight of the upper jaw. Hence, the upper jaw, in its movement relatively to the workpieces, always bears on the abutment which forms that arm of the rocking angle which is parallel to the bearing plane, that is to say, the upper jaw, in its movement relatively to the workpieces, is displaced exactly parallel to the bearing plane thereof.

As a guide for the bearing block, at least one rod is employed, with the bearing block sliding as a bushing upon the rod. In this case, the length of the bushing is equal to the distance over which the bearing block is guided.

According to a further feature of the invention, a pushbutton switch is provided on the power piston that moves the upper jaw. This pushbutton switch makes contact for the blocking of the pressure pipe leading to the power piston as soon as a definite pressure has built up in the pressure liquid, or in other words as soon as the workpieces are lying side-by-side in the clamping device of the saw, and are pressed by the upper jaw against the lower jaw. By the closure of the pressure pipe, the power piston is arrested, and an invariable gap is thus advantageously provided between the upper and lower jaws, which is then used as a guide for the workpieces when they are being pressed against the stationary abutment of the clamping device. Here, for moving the abutment guided in the upper jaw, a further power piston is provided, and this further power piston is likewise provided with a pushbutton switch. The pushbutton switch of the power piston for moving the upper jaw is coupled to the power piston that moves the further abutment, and its pushbutton switch is coupled with the power piston that moves the upper jaw, and with the feeding drive of the saw, so that the workpieces can be first lightly clamped between the upper jaw and the lower jaw, and can then be pressed by the further abutment against the stationary abutment, before they undergo their ultimate clamping between the upper jaw and the lower jaw. This occurs because with the pushbutton switch of the power piston that moves the abutment, contact is established for the further clamping of the workpieces between the upper and lower jaws, and, at the same time, contact for setting the saw into operation is established as soon as a definite pressure has been built up in the pressure pipe leading to the power piston that moves the further abutment.

As a feeding drive for the saw, at least two power pistons are employed, which are pivotally connected with the saw. In this case, the piston face of one of the two power pistons will be loaded, while the annular surfaces of the two power pistons, during this loading operation, are energized with the pressure from the resistance of at least one flow valve or throttle valve. The resistance of the flow valve or throttle valve increases with the rate of feed, that is to say, when the saw is being drawn into the material, the resistance of the flow or throttle valve, advantageously opposed an increase in the speed of advance.

According to a further feature, the power piston that moves the upper jaw, the power piston that moves the abutment, and the power piston that moves the saw have a common hydraulic circuit, in which the annular surface of the power piston that moves the upper jaw is energized by way of a one-way valve, and, except for the unloaded piston face area of one of the two power pistons pertaining to the saw, the remaining piston faces and annular surfaces are energized by way of two-way valves. The valves are electromagnetically actuated, and are controlled by the pushbutton and limit switches which cooperate with the movable support that accommodates the saw blade.

Furthermore, the upper jaw, at its contact surface with the workpieces, is formed by a plurality of portions. Between these portions, a flexible material is provided, so that this surface of the upper jaw adapts itself to the workpieces, and the workpieces, upon the final clamping, that is, upon the actual sawing operation, become advantageously embedded in the upper jaw.

BRIEF DESCRIPTION OF THE DRAWINGS

Some embodiments of the invention are illustrated by way of example in the accompanying drawings, in which:

FIG. 2 is a fragmentary view partly in elevation and partly in cross section, the upper jaw of the constructional example of FIG. 1;

FIG. 3 is a further view partly in elevation and partly in cross section of the upper jaw of FIG. 2;

FIG. 4 is a view, partly in elevation and partly in cross section of a further constructional example.

DETAILED DESCRIPTION OF THE INVENTION

Figure 1:
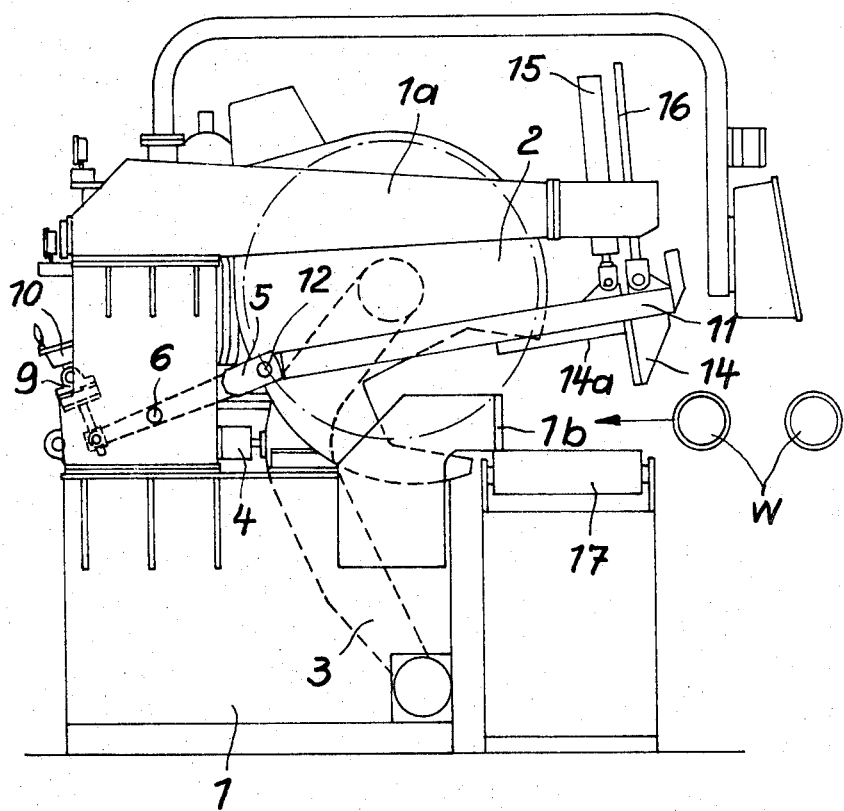
FIG. 1 is an elevational view of one construction example.

According to FIGS. 1 to 3, a saw, in this case a circular saw 2, is so supported in a saw casing 1, with a swinging arm 3 as to be movable in the cutting plane. The circular saw 2 is driven by an oil engine flanged to the swinging arm 3, while the swinging arm 3 is moved by two power pistons 4, located side-by-side, which are mounted in the saw casing 1. In the saw casing 1 is also rockably supported a double-armed lever 5, upon a fulcrum 6. The lever 5 accommodates a screw-threaded member 7 in one arm, and is of forked construction on the other arm. The threaded member 7 is, at the same time rotationally fast, and is so supported in the lever 5 that it can turn in the plane of oscillation of the lever 5. It cooperates with an adjusting spindle 8, which in its turn is rotationally movable, and is pivotally supported in the plane of oscillation of the lever 5, in a pedestal 9 flanged to the saw casing 1, and is moved by way of a handwheel 10.

An upper jaw 11 is rockable about bolts 12 in the forked arm of the lever 5. To the bolts 12 are, at the same time, pivoted power pistons 13, which engage on an abutment 14 slidably supported in guides 11a (FIG. 3) of the upper jaw 11. The distance of the axis of the bolts 12 from a line which is perpendicular to the contact surface of the abutment 14 with workpieces W at the center of gravity of that surface is preferably as short as possible, so that from the displacement of the abutment 14, or in other words, the force pressing the workpieces W against abutment 1b produces only a slight moment about the axis of oscillation of the upper jaw 11. The saw casing 1 further comprises a bracket 1a in which are rockably supported power pistons 15 and guiding rods 16, the plane of oscillation of which coincides with the plane of oscillation of the upper jaw 11. The power pistons 15 act on the upper jaw 11 and rock the latter, while the guiding rods 16, which are likewise attached or pivoted to the upper jaw 11, prevent the occurrence of a bending stress in the power pistons 15.

When the saw is in operation, the workpieces W to be divided are conveyed, in a direction opposite, for instance, to the cutting direction of the circular saw 2, in between the upper jaw 11 and the lower jaw, which is constructed as a roller table 17, with a direction of conveyance at right angles to the cutting direction of the circular saw 2. Thereupon, the upper jaw 11, the axis of oscillation of which has been previously adjusted to the height of the workpieces W, by means of the lever 5, the adjusting spindle 8 and the handwheel 10, is pressed by the power pistons 15 on to the workpieces W in such a way that surface 14a of the upper jaw 11 comes into contact simultaneously with all the workpieces W resting upon the roller table 17. The power pistons 15 are thereupon arrested, and the power pistons 13 are actuated, which move the abutment 14 towards the stationary abutment 1b on the saw casing 1, and in so doing clamp the workpieces W, which are guided between the contact surface 14a and the roller table 17. After the clamping of the workpieces W in the direction parallel to the plane of delivery of the roller table 17, the power pistons 15 are actuated again, and, in addition, the power pistons 4 are actuated. The power pistons 15 clamp the workpieces additionally in a direction perpendicular to the direction of the first clamping, while the power pistons 4 move the circular saw 2 towards the workpieces W. After the dividing of the workpieces W, all the power pistons and therefore also the circular saw 2, the upper jaw 11 and the abutment 14, are moved back into their original positions, and the divided workpieces W are carried away by the roller table 17, and fresh workpieces W are brought in between the upper jaw 11 and the roller table 17.

The contact surface 14a consists of portions 14b, which are supported by a flexible material 14c, india rubber for example, on the upper part of the abutment 14, so that the workpieces W, after the clamping thereof, become embedded in the surface 14a.

According to FIG. 4, in a further embodiment of the invention, instead of the lever 5, two rods 18 are secured to the saw casing 1, and upon each rod 18 a bushing 19 is so mounted by means of ball-race bushings 20, as to be slidable in an axial direction. The upper jaw 11 comprises an additional cam 11b, and is supported with the bolt 12 in the bushings 19. The bushings 19 are provided with abutments 19a and 19b, which limit the rocking movement of the upper jaw 11 to an acute angle, the abutment 19b occasioning a position of the contact surface 14a parallel to the plane of conveyance of the roller table 17. Furthermore, in the bushings 19, rings 21 are provided as clamping members. The rings 21 prevent the bushings 19 sliding down the rods 18 owing to their intrinsic weight and to the weight of the upper jaw 11. The bushings 19 are guided with a length S, which corresponds to the distance between the centers of the ball-race bushing 20.

When this embodiment of the invention is in operation, the upper jaw 11, with the cam 11b, is rocked by the power pistons 15 against the abutment 19b, and is then moved in this angular position towards the workpieces W. No jamming of the bushing 19 now occurs, since the force of friction occurring between the bushing 19 and the rods 18 owing to the lever action of the upper jaw 11 is smaller than the force of the power pistons 15 moving the upper jaw 11. The clamping of the workpieces W and their parts by the circular saw 2 is effected in the same way as to the first embodiment. After the dividing of the workpieces, the upper jaw 11, with the cam 11b, is rocked back by the power pistons 15 against the abutment 19a, and the upper jaw 11, together with the bushings 19 in this angular position, moves back into its original position.

Figure 5:
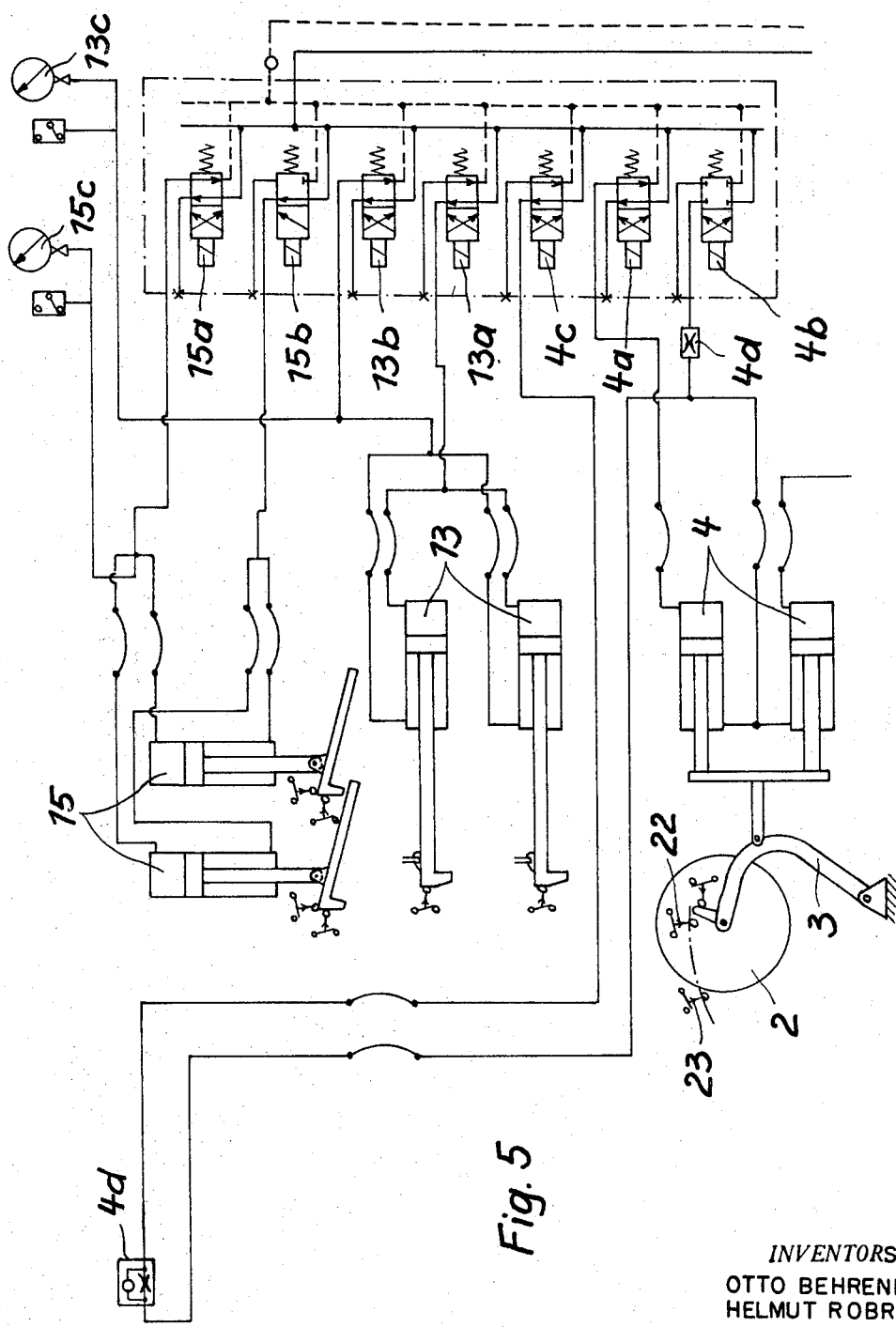
FIG. 5 shows a circuit diagram of the hydraulic circuit of the constructional examples of FIGS. 1 to 4.

According to FIG. 5, the power pistons 4 and 13 and 15 have a common hydraulic circuit. The piston surfaces of the power pistons 15 are energized by way of a two-way valve 15a, and their annular surfaces by way of a one-way valve 15b, the piston surfaces of the power pistons 13 by way of a two-way valve 13b, and their annular surfaces by way of a two-way valve 13a, the piston surface of one of the two power pistons 4 by way of a two-way valve 4a, and the annular surfaces of both the power pistons 4 by way of a two-way valve 4b and a two-way valve 4c. Here, between the valves 4a and 4b and the associated annular surfaces, a flow or throttle valve 4d is in each case provided. Furthermore, between the valve 15a and the associated piston surfaces a pushbutton switch 15c is arranged, and between the valve 13b and the associated annular surfaces, a pushbutton 13c. The piston surface of the second power piston 4, not energized by way of the valve 4a, is connected with the oil storage tank of the hydraulic circuit. All the valves 15a, 15b, 13a, 13b, 4a, 4b, 4c have two positions, and are electromagnetically actuated.

When in operation, contact for the valve 15a is established by an operator for the starting of the clamping and cutting operation, so that the upper jaw 11 is moved against the workpieces W by the difference between the pressure on the piston face and that on the annular surface, while the circular saw 2 and the abutment 14 remain in their initial positions. As soon as the upper jaw 11 comes into contact with the workpiece W, or these bear side-by-side upon the roller table 17, the difference pressure that is building up releases the pushbutton switch 15c, which establishes contact for the valves 15b, 13a and 13b, and interrupts the contact for the valve 15a. In this way, the power piston 15 and the upper jaw 11 are arrested, and the abutment 14 and the power pistons 13 are brought into operation. The pressure thus building up in the pressure pipe between the valve 13b and the associated annular surface releases the pushbutton switch 13c, which establishes contact for the valves 15a, 4a , 4b and 4c, and interrupts the contact to the valve 15b, so that the arresting of the power pistons 4 is released, and these continue to clamp the workpieces W, and the circular saw 2 moves towards the workpieces W, with the swinging arm 3 being moved against the resistance of the flow or throttle valves 4d. Before the circular saw 2 reaches the workpieces W, the rocking arm 3 releases a limit switch, which interrupts the contact to the valve 4b. Thus, the pressure pipe between the valve 4b and the associated annular surface is closed, and the resistance against which the rocking arm of the circular saw 2 is moved rises, owing to the flow or throttle valve 4d pertaining to the valve 4c, so that the circular saw in cutting, is moved at a considerably reduced speed. At the end of the travel of the circular saw, or in other words after the dividing of the workpieces W, the swinging arm 3 releases a limit switch 23. The limit switch 23 interrupts all the existing contacts to the valves, so that the power pistons 4, 13 and 15, and therefore also the upper jaw 11, the circular saw 2 and the abutment 14, are moved back into their original positions.

In a further constructional example, a timing relay is provided, which, immediately before the arresting of the power pistons 15, occasions the lifting or relieving of the upper jaw 11, in order to move the workpieces W, practically without frictional resistance in the guide, between the surface 14a and the roller table 17, upon the clamping thereof. For this purpose, the timing relay switches the valve 15b after a short time lag relatively to the valve 15a.

We claim:
1. A saw, comprising: a saw frame, a saw blade movably mounted in the saw frame, a clamping device, including a stationary lower jaw, an upper jaw rockable about a horizontal axis, and a bearing surface for supporting workpieces to be divided by the saw, a stationary abutment at the beginning of the saw blade advance, and a second abutment at the end of the saw blade advance, said second abutment being lowerable from above and horizontally displaceable for passing the workpieces against the stationary abutment, and the axis of oscillation of the upper jaw being arranged in about the plane defined by the upper edge of the workpieces and in the direction of saw blade advance before the stationary abutment.

2. The saw as claimed in claim 1, in which the axis of oscillation is adjustable in a vertical direction for adaptation to the workpieces.

3. A saw comprising: a saw frame, a saw blade movably mounted in the saw frame, means for positively guiding the saw blade with respect to its forward feeding speed, a clamping device, including a substantially stationary lower jaw, a rockable upper jaw, and a bearing plane for supporting workpieces to be divided by the saw, a stationary abutment so located at the side of the clamping device remote from the saw blade that the clamping device is freely accessible from the other side and also transversely to the direction of motion of the saw, a second abutment, displaceable relatively to the stationary abutment, for urging the workpieces horizontally towards the stationary abutment, so that a so-called drawing of the saw into the material is prevented, and the upper jaw, upon coming into contact with the workpieces, is moving exactly perpendicularly to the bearing plane, a guide extending perpendicularly to the bearing plane, a bearing block movable in said guide, the upper jaw of the clamping device being rockably mounted in said bearing block, and abutments in the bearing block, adapted to limit the rocking movement of the upper jaw to an acute angle, one arm of which is parallel to the bearing plane, so that the upper jaw is adjusted to the height of the workpieces to be cut.

4. The saw as claimed in claim 3, further comprising: a first power piston for moving the upper jaw, the center of gravity of the contact surface of the upper jaw with the workpieces being located between the point at which said power piston acts on the upper jaw and the axis of oscillation of the upper jaw, and the ratio of the length with which the bearing block is guided in the guide to the distance between the point at which said power piston acts on the upper jaw and the axis of oscillation of the upper jaw being greater than the coefficient of friction between the guide and the bearing block, so that a so-called self-locking of the bearing block in the guide is prevented.

5. The saw as claimed in claim 3, further comprising: at least one gripping member capable of preventing the said bearing block being pulled downwards by the intrinsic weight of the bearing block and the upper jaw.

6. The saw as claimed in claim 3, in which said bearing block consists of at least one rod, acting as a guide, and a bushing slidable upon said rod.

7. The saw as claimed in claim 4, further comprising: a first pushbutton switch mounted on the power piston that moves the upper jaw, and said pushbutton switch being adapted to arrest the upper jaw in its pressing position at a predetermined contact pressure.

8. The saw as claimed in claim 7, further comprising: means for imparting a feeding movement to the saw blade, a second power piston, for moving the abutment which is displaceable in the upper jaw, a second pushbutton switch, coupled with the first power piston, which acts upon the upper jaw, and with the means for imparting feeding movement to the saw blade, the second power piston being coupled with the first pushbutton switch, so that the workpieces can first be lightly clamped between the upper jaw and the lower jaw of the clamping device, and can then be pressed by the displaceable abutment against the stationary abutment, before they undergo their final clamping between the upper jaw and the lower jaw.

9. A saw comprising: a saw frame, a saw blade movably mounted in the saw frame, means for positively guiding the saw blade with respect to its forward feeding speed, a clamping device, including a substantially stationary lower jaw, a rockable upper jaw, and a bearing plane for supporting workpieces to be divided by the saw, a stationary abutment so located at the side of the clamping device remote from the saw blade that the clamping device is freely accessible from the other side and also transversely to the direction of motion of the saw, a second abutment, displaceable relatively to the stationary abutment, for urging the workpieces horizontally towards the stationary abutment, so that a so-called drawing of the saw into the material is prevented, and the upper jaw, upon coming into contact with the workpieces, is moving exactly perpendicularly to the bearing plane, at least two power pistons pivotally connected with the saw blade for imparting a feeding movement to the saw blade, means for applying fluid pressure to the piston face of one of the power pistons, at least one flow and throttle valve, means for loading the annular surfaces of both said power pistons with pressure derived from the resistance of said flow and throttle valve, so that the saw is braked by the increasing resistance of the flow and throttle valve if a pulling action occurs upon the so-called drawing into the material.

10. The saw as claimed in claim 8, further comprising at least two power pistons pivotally connected with the saw blade for imparting a feeding drive to the saw blade, a common hydraulic circuit controlling all the power pistons, a one-way valve controlling the admission of pressure liquid to the annular surface of the piston that moves the upper jaw, and two-way valves controlling the admission of pressure liquid to all the other piston faces and annular surfaces of the pistons.